Figure 1:
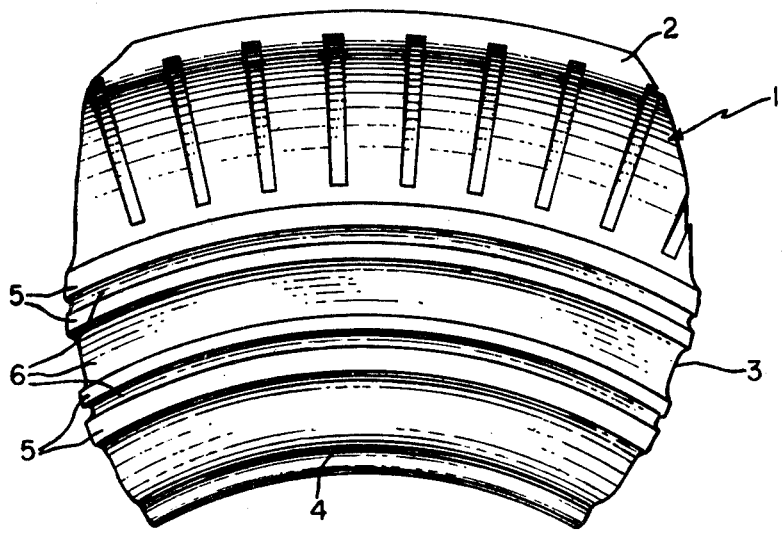

United States Patent [19]

Pearson et al.

[11] 4,158,378
[45] Jun. 19, 1979

[54] TIRE HAVING POLYURETHANE LAMINATE THEREON

[75] Inventors: Charles J. Pearson; Jeffrey W. Saracsan, both of Akron, Ohio

[73] Assignee: The Goodyear Tire & Rubber Company, Akron, Ohio

[21] Appl. No.: 861,775

[22] Filed: Dec. 19, 1977

[51] Int. Cl.$^2$ ............................................. B60C 13/00
[52] U.S. Cl. ................................ 152/353 R; 156/116; 427/421; 428/423
[58] Field of Search .................... 156/110 R, 116, 242; 152/330 R, 353 R, 357 R, DIG. 12, 374; 428/423, 425; 427/299, 300, 322, 421, 424, 425; 260/75 NK, 75 NB, 75 NC, 75 NP, 75 EP, 77.5 NC, 77.5 AP, 77.5 AQ, 77.5 AB

[56] References Cited
U.S. PATENT DOCUMENTS

| | | | |
|---|---|---|---|
| 3,190,338 | 6/1965 | Wolfe | 428/423 |
| 3,350,406 | 10/1967 | Meyer et al. | 260/37 EP |
| 3,623,900 | 11/1971 | Jonnes et al. | 156/116 |
| 3,623,900 | 11/1971 | Jonnes | 152/353 R |
| 3,648,748 | 3/1972 | Lovell | 152/353 R |
| 3,926,919 | 12/1975 | Finelli | 260/75 NH |
| 3,979,547 | 9/1976 | Roberts et al. | 156/116 |
| 4,024,317 | 5/1977 | Stoye | 428/423 |
| 4,045,474 | 8/1977 | Taller et al. | 428/423 |

Primary Examiner—John E. Kittle
Attorney, Agent, or Firm—H. C. Young, Jr.

[57] ABSTRACT

A tire comprised of a composite structure of a cured rubber tire having adhered thereto a laminate of a cured polyurethane. Said laminate is prepared by (A) applying to the cured rubber tire a solution of a reaction mixture comprised of (i) an aliphatic primary diamine, (ii) a specified prepolymer utilizing a polycaprolactone polyol, and (iii) an organic solvent followed by (B) drying and curing the applied solution.

17 Claims, 3 Drawing Figures

TIRE HAVING POLYURETHANE LAMINATE THEREON

This invention relates to a tire having a laminate thereon and to a method of its preparation.

Heretofore, various methods have been employed to provide vehicular pneumatic and solid cured rubber tire having decorative, protective and identification laminates thereon. For example, such laminates have been prepared by coating portions of a cured rubber tire with various plastics and paints, including polyurethanes.

Gouges and punctures in cured rubber tires have been repaired by plugging the gouge or hole with uncured rubber and curing it in place, by coating with various plastics, rubbers and paints including polyurethanes and by cementing a cured plug of rubber in place. However, repair of punctured or gouged light colored portions of rubber tires, such as white sidewalls, typically results in commercially undesirable blemishes in the portion around the repair.

Polyurethane laminates on tire sidewalls have been made using polybutadiene polyol/polyisocyanate polyurethanes applied as a solvent-free reaction mixture without an added curative (U.S. Pat. No. 3,648,748). However, it is still desired to provide an effectively adherent polyurethane laminate for a pneumatic tire, particularly as an outer sidewall laminate, which is applied in a solvent reaction mixture containing a diamine curative.

Therefore, it is an object of this invention to provide a cured rubber tire having an adherent laminate thereon and which can provide a decorative, protective or identification surface of the tire.

In accordance with this invention, a tire comprises a composite structure of a cured rubber tire having adhered thereto a laminate of a cured polyurethane prepared by (A) applying to a cured rubber tire a solution of a reaction mixture comprised of (i) an aliphatic primary diamine, (ii) a prepolymer prepared by reacting an organic polyisocyanate having an isocyanate functionality in the range of about 2 to about 2.8, with a polycaprolactone polyol having a number average molecular weight in the range of about 2500 to about 3700, preferably about 2700 to about 3100, and an average hydroxy functionality of about 2, and (iii) about 7 to about 90, preferably about 25 to about 60, weight percent organic solvent based on the total of (i, ii and iii), where the mole ratio of isocyanato groups to hydroxyl groups of the polyol is in the range of about 1/1 to about 3/1, preferably about 1.5/1 to about 2.5/1, and where the mole ratio of amine groups of the diamine to excess isocyanate groups over the hydroxyl groups is in the range of about 0.8/1 to about 1.2/1, preferably about 0.9/1 to about 1.1/1 and (B) drying and curing the applied solution of reaction mixture to form the composite structure.

The invention is particularly directed to such a tire as a pneumatic rubber tire having a ground contacting tread portion and spaced beads connected by sidewalls extending radially from said beads to said tread, where at least one of said sidewalls has such a laminate adhered to and over its outer surface.

In the practice of this invention, preferably about 70 to about 100 weight percent of the solvent is mixed with the diamine curative and the solution thereof then mixed with the prepolymer. Preferably the prepolymer itself is in liquid form without the aid of a solvent, although, as already pointed out, up to about 30 weight percent of the solvent can be mixed with the prepolymer to form a solution thereof before mixing with the diamine solution.

In the further practice of this invention, it is preferred to first treat the area of the surface of the tire on which the laminate is to be formed by cleaning with an organic solvent and drying to remove surface oils and mold release agent which may remain after the tire curing operation. Further treatment with chlorine water may be desired and often preferred. Buffing to abrade the surface may also be done, if desired, normally prior to cleaning.

Figure 2:
Figure 3:
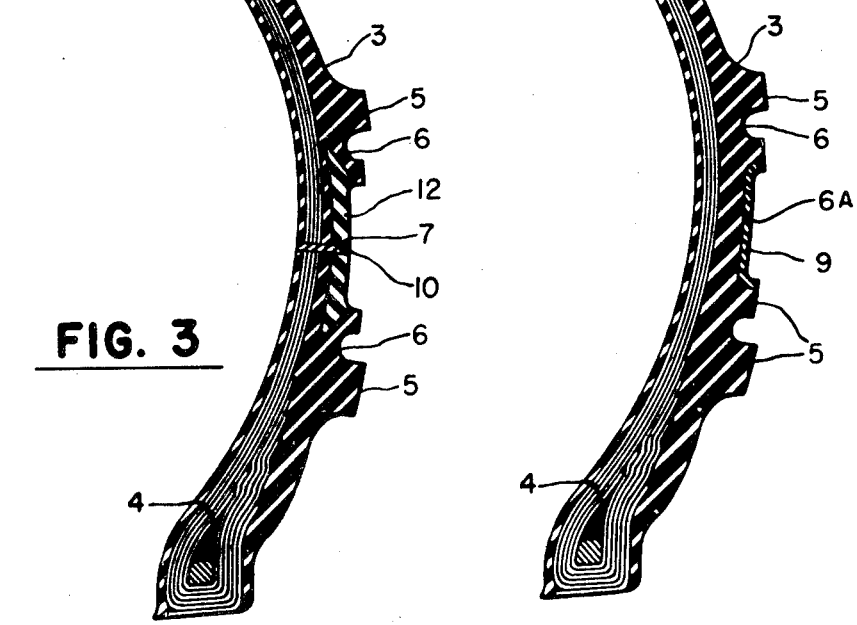

Further objects and advantages of this invention will be apparent by reference to the accompanying drawings in which FIG. 1 is a side elevational view and FIGS. 2 and 3 are partial cross-sectional views of black treaded cured rubber tires with FIGS. 2 and 3 having adherent cured polyurethane laminates.

Referring to the drawings, the cured rubber tire 1 comprises the usual tread portion 2, sidewall 3 and bead portion 4. The sidewall can comprise a plurality of ribs 5 and recessed portions 6 extending circumferentially around the sidewall.

In this invention, at least one of the recessed portions or grooves 6A or punctures or gouges, 7 and 8 in the cured vehicular tire is cleaned by washing with methyl ethyl ketone solvent at about 25° C. and then dried. It is then buffed followed by chlorine water treatment and dried. One of the punctures 7 is in white sidewall 12 and puncture 8 is in a black tread portion. The groove 6A or punctures 7 and 8, their surfaces are coated with a solution of the polyurethane reaction mixture of this invention, 9, 10 and 11, at about 25° C. and the mixture dried and cured for up to about 16 hours at 25° C. to form adherent laminates including adherent sealing plugs 10 and 11 for the punctures 7 and 8. In particular, the reaction mixture used for the puncture 7 is colored white with titanium dioxide and cured to form an adherent white polyurethane plug 10 matching the white color of the white sidewall without blemishes around its outer portion, mixture 9 being colored white and 11 black.

In the practice of this invention, the cured rubber tire can be various cured rubbers, such as natural rubber and synthetic rubbers. For example, they could be rubbery butadiene-styrene copolymers, butadiene-acrylonitrile copolymers, polyisoprene, polybutadiene, isoprene-butadiene copolymers, butyl rubber, ethylene-propylene copolymers, and ethylene-propylene terpolymers. Typically the various polymers are cured by normal curing methods and recipes such as with sulfur or with peroxides, in the case of the ethylene-propylene copolymers.

It is preferred that the cured polyurethane laminate of this invention is loaded with fillers to enhance its physical properties. Thus, it is preferred that the cured polyurethane contains from about 5 to about 100 parts by weight, based on 100 parts of polyurethane prepolymer, of typical particular rubber reinforcing fillers, such as carbon black, titanium dioxide, zinc oxide, calcium carbonate, filler clays, silicas and coloring pigments. The addition of the reinforcing fillers preferably provides a cured polyurethane having an ultimate tensile strength of from about 300 pounds per square inch (psi) to about 2000 psi, measured on an Instron tester at a crosshead of 5 inches per minutes at 25° C. and with a corresponding ultimate elongation of from about 700 percent to about 250 percent at about 25° C. according to the generally accepted rubber testing methods. Thus, such a filler-reinforced cured polyurethane having a tensile strength of about 300 psi has an elongation in the range of about 700 percent and such a filler-reinforced cured polyurethane having a tensile strength of about 2000 psi has an elongation in the vicinity of 250 percent. Therefore, the loaded cured polyurethane is preferred to have physical properties such as tensile strength and elongation similar to the cured rubber tire on which it is a laminate.

Preferably the 100 percent modulus of the cured polyurethane laminate is from about 60 to about 170 percent of the 100 percent modulus of the rubber of the surface of the tire to which it is adhered.

The polyurethane prepolymer is prepared by reacting the diisocyanate with the polyol at a temperature in the range of about 80° C. to about 110° C. for about 30 to about 60 minutes.

Representative examples of various polyisocyanates which can be used include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis cyclohexane diisocyanate, 1,4-cyclohexane bis methyl isocyanate, isophorone diisocyanate as (3-isocyanato methyl-3,5,5-trimethyl cyclohexyl isocyanate), 1,5-tetrahydronaphthalene diisocyanate, p-xylene diisocyanate, m-xylene diisocyanate and polymers, such as dimers and trimers of such diisocyanates.

For the purpose of the present invention, the diisocyanates having their isocyanate groups connected to nonbenzenoid carbon atoms are preferred and, indeed, used where color retention is important, as it usually is for rubber tires, representative of such diisocyanates are 3-isocyanatomethyl-3,5,5-trimethylcyclohexyl isocyanate, 4,4'-methylene bis cyclohexane diisocyanate, 1,4-cyclohexane bis methyl isocyanate, p-xylene diisocyanate and m-xylene diisocyanate.

The polycaprolactone polyols for the preparation of the prepolymer are of the type exemplified as being prepared by reacting ε-caprolactone with a small amount of an initiator such as diethylene glycol or a hydrocarbon diol containing 4 to 7 carbon atoms such as 1,4-butane diol, 1,5-pentane diol, and 1,6-hexane diol, preferably diethylene glycol and, optionally, a small amount of modifier (e.g., less than about 10 weight percent based on total polyol) such as adipic acid, succinic acid, azelaic acid or the condensation product of low molecular weight saturated hydrocarbon diols containing 2 to 10 carbon atoms with an organic polycarboxylic acid selected from succinic acid, adipic acid and azelaic acid, as well as anhydrides of such acids, polyethylene adipate and poly(ethylene propylene)adipate.

The diamine curative is then reacted with the prepolymer at a temperature in the range of about 10° C. to about 40° C. The reaction is almost instantaneous, such as from a few seconds to a few minutes. Typically, the reaction may be in the range of about 1 to about 10 minutes.

Representative of various suitable primary diamines are p-xylene diamine, m-xylene diamine, 4,4'-diaminodicyclohexyl methane, 3-aminomethyl-3,5,5-trimethyl-cyclohexylamine, 1,4-cyclohexane-bis-methylamine, tetrachloro-p-xylene diamine, cyclobutane-1,2-bis-methylamine, menthane diamine, imino bis propylamine, ethylene diamine, propane diamine, trimethylene diamine, tetramethylene diamine, hexamethylene diamine and dimethyl hexamethylene diamine.

For the purpose of the present invention, primary diamines having their amino groups connected to nonbenzenoid carbon atoms are preferred and, indeed, used where color retention is important, as it usually is for rubber tires.

The polycaprolactone polyols have a hydroxyl functionality of about 2. They typically have a viscosity at about 30° C. of from about 10 poise to about 150 poise and more generally from about 20 poise to about 100 poise. A catalyst is not normally desired, although it could be used to increase the already fast reaction rate between the polyol and the polyisocyanate. Suitable catalysts are the well known catalysts typically used for polyurethanes. Representative of the various catalysts are dibutyltin dilaurate, stannous octoate, magnesium oxide, butyl aldehyde-butyl amine condensation product, 2-mercaptobenzothiazole, cobalt naphthenate and tertiary amines, such as triethylene diamine, methylated tetraethylene tetramine and hexamethylene tetramine. It has been found that the organotin compounds such as dibutyltin dilaurate and stannous octoate are the more useful catalysts, if a catalyst is desired.

A non-reactive solvent is used with the polyurethane reaction mixture. The solvent is particularly desirable because of the fast reaction rate. Representative of the many suitable organic solvents are aromatic solvents such as benzene and toluene, the paraffinic, naphthenic and aromatic naphthyls, liquid ketones such as acetone, methyl ethyl ketone, diethyl ketone, methyl isobutyl ketone, methyl isoamyl ketone, diisobutyl ketone, ethyl acetate, ethylene glycol monoethyl ether acetate, dioxane and chlorinated hydrocarbons such as trichloroethylene, methylene chloride, etc. The addition of a solvent to the polyurethane reaction mixture can be particularly desirable where its viscosity is required to be adjusted for spray applications.

The preparation of the cured rubber surface of the tire is preferably done by cleaning with a suitable solvent for the purposes of removing surface oils and the like. Any of the various solvents used for dissolving oils can be used which do not dissolve or swell the rubber surface. Representative of such solvents are mineral spirits, Stoddard solvent, liquid ketones such as acetone, methyl ethyl ketone, methyl isobutyl ketones, diisobutyl ketone, diethyl ketone, methyl isoamyl ketone, liquid alcohols such as methanol, ethanol, isopropanol and butanol, aromatic hydrocarbons such as benzene, toluene and xylene, aliphatic hydrocarbons such as pentane, hexane, heptane, neohexane (2,2-dimethylhexane) and dimethyl pentane and dimethyl formamide. The mineral spirits, sometimes known as petroleum spirits, is typically identified by ASTM test D 235-61 and the Stoddard solvent is typically identified by ASTM test D 484-52 as a specification for the solvent approved as a United States standard by the United States Standard.

The invention is, therefore, useful as an improved method of identification and also for preparing a pneumatic tire including a generally toroidal shaped carcass, spaced beads having rubber sidewalls and a rubber tread, at least one of the sidewalls having a plurality of circumferentially extending grooves and having an adherent layer of the cured polyurethane in at least one groove therein, said layer having a color contrasting to the tire. In one aspect of this invention, pigments, such as small colored metal or other chips or spangles, can be dispersed in the polyurethane reaction mixture to provide an adherent polyurethane layer in a recessed portion of the tire with colored spangles such as, for example, pieces of light reflective metal, disposed in the said polyurethane, to provide a decorative as well as a protective utility.

The following illustrative examples are set forth to further exemplify the objects and advantages of the invention. The parts and percentages are by weight unless otherwise indicated.

EXAMPLE 1

A pneumatic black-colored, cured butadiene/styrene radial ply rubber tire, having a non-staining sidewall with circumferential grooves therein, similar to FIGS. 1 and 2, was obtained. It was a radial ply HR-78-15 passenger car-type tire.

First, one of the circumferential grooves was buffed and then washed with methyl ethyl ketone and allowed to dry. The sidewall of the tire was masked with tape to cover the sidewall, yet expose the grooves. Chlorine water, containing about 0.2 to about 0.4 percent available chlorine, was applied to the exposed groove and the surface of the groove was allowed to remain wet for about one minute. The groove was then dried by air suction using a rubber tube connected to an aspirator.

The treated tire was then mounted vertically on a rotating machine. Two liquid urethane coatings were applied to the groove, while rotating the tire, allowing a 4-minute drying time between coats. As soon as the second coat was applied to the groove, and while the tire was still rotating, the masking tape was removed from the sidewall.

After the coating in the groove was tack-free, the tire was removed from the rotating machine and positioned in a horizontal position and the coating allowing to cure at about room temperature, or about 25° C.

The tire was mounted on a rim, inflated, and mounted on an outdoor resiliometer. On the resiliometer, the tire was run at a speed equivalent to a vehicular speed of about 31 miles per hour (mph) under a load of about 1770 pounds and an inflation pressure of 24 pounds per square inch (psi). The test tire 5B2050-9 ran 57,697 miles on the resiliometer before it failed due to belt edge separation. There were no radial cracks observed in the coated white sidewall groove.

For this example, the white polyurethane reaction mixture, used for preparing the white-coated sidewall groove, was prepared by the following method.

First, a diluted prepolymer (50 percent by weight) was prepared from a polycaprolactone diol having a reactive number of 37.7 and a molecular weight of 3000, with a hydrogenated diphenylmethane-4,4'-diisocyanate. In this regard, the polycaprolactone diol was added to a suitable reactor and degassed under a reduced pressure with stirring at a temperature of about 180° F. The diisocyanate was then added to produce a mixture with the ratio of one mole polyol for two moles diisocyanate. With continued stirring, the temperature of the mixture was increased to 230° F. and to allow for a more complete reaction, a mixture was stirred at this temperature for about 45 minutes. The resulting urethane prepolymer was degassed and diluted with 50 percent by weight in toluene to present a free NCO (isocyanate) content of 1.13%.

The diluted prepolymer recipe is more clearly shown in the following Table 1.

Table 1

| DILUTED PREPOLYMER RECIPE (50%) COMPOUND | |
|---|---|
| Compound | Parts |
| Polycaprolactone diol (3000 m.w.)[1] | 1000 |
| Hydrogenated diphenylmethane-4,4'-diisocyanate | 178 |
| Toluene | 1178 |
| | 2356 |

[1]A polymer of ε-caprolactone with a small amount of adipic acid and diethylene glycol as initiator.

A white masterbatch was prepared by charging 400 parts of the diluted propolymer into a ball mill followed by 40 parts of titanium dioxide powder, 2 parts phenolic antioxidant, 4 parts silicate-type thickening agent, and 46 parts toluene. The mixture was ball milled for about 8 hours at about room temperature, or about 25° C. The white masterbatch was then strained through a gauze filter into a suitable container.

The recipe for the white masterbatched prepolymer is more clearly shown in the following Table 2.

Table 2

| WHITE MASTERBATCHED PREPOLYMER RECIPE | |
|---|---|
| Compound | Parts |
| Diluted Prepolymer | 400 |
| Titanium Dioxide powder | 40 |
| Phenolic antioxidant | 2 |
| Silicate-type thickening agent | 4 |
| Toluene | 46 |
| | 492 |

A diluted curative was prepared by charging 20 parts isophorone diamine to a suitable container followed by 20 parts methyl ethyl ketone and 60 parts methyl isobutyl ketone. The mixture was shaken and allowed to stand for about three days before using at about room temperature, or at about 25° C.

The final polyurethane spray recipe used for striping, or coating, the tire groove on its sidewall, was prepared by mixing the white masterbatched prepolymer, additional methyl ethyl ketone solvent, a hexamethylene diisocyanate solution, propylgallate in methyl ethyl ketone, and the diluted curative. The polyurethane recipe is more clearly shown in the following Table 3.

Table 3

| SPRAY POLYURETHANE RECIPE | |
|---|---|
| Compound | Parts |
| White masterbatched prepolymer | 75.0 |
| Methyl ethyl ketone | 7.5 |
| Hexamethylene diisocyanate solution[1] | 0.5 |
| 10% propylgallate in methyl ethyl ketone | 1.1 |
| Diluted curative | 7.0 |
| | 91.1 |

[1]Product of hexamethylene diisocyanate and water in a 3/1 weight ratio as a solution in 25 weight percent ethyl acetate, based on the solution.

The polyurethane spray recipe was applied with an air gun having a size 30 nozzle, using an atomization pressure of about 25 psi. Actually, the spray recipe shown in Table 4 must be duplicated (multiplied by two) to give the total amounts of material needed for the striping operation since two coats were actually supplied to the groove in the sidewall. The equivalent amine level of the polyurethane mixture was about 1.0 and its pot life at about room temperature, or about 25° C. was about 15 minutes.

EXAMPLE 2

A tire was prepared similar to that of Example 1, by the method used in Example 1, except that a polycaprolactone diol of ε-caprolactone with the adipic acid and diethylene glycol initiator, was used having a reactive number of 39.2, and 286 parts of isophorone diisocyanate was used in the prepolymer recipe to give a 50% diluted prepolymer having a free NCO of 0.95%. The same white masterbatch was used except for the change in the diluted prepolymer. The polyurethane spray recipe was the same except for the following differences shown in Table 4.

Table 4

| SPRAY POLYURETHANE RECIPE | |
|---|---|
| Compound | Parts |
| White masterbatched prepolymer | 75.0 |
| Additional methyl ethyl ketone solvent | 7.5 |
| 10% propyl gallate in methyl ethyl ketone | 1.1 |
| Diluted curative | 5.8 |

In the practice of this invention it has been observed that the adherent polyurethane liquid has a reasonable and good resistance to hydrolysis upon extended exposure to atmospheric conditions, particularly as a laminate on the outer surface of the pneumatic rubber tire sidewall.

However, if desired, to further enhance the cured polyurethane's hydrolysis resistance from 1 to about 15, preferably about 2 to about 7, weight percent of an epoxy resin and at least sufficient to give an excess of epoxide groups relative to total excess of amino groups of the diamine curative over the said excess isocyanate groups is added.

In the practice of this invention, the epoxy resin is conveniently mixed with at least one of the diamine component or prepolymer, optionally containing the filler, component.

Thus, an excess of epoxide groups is required over the excess amino groups of the curative, such as at least about 5 to about 50 equivalent percent excess based on two epoxy groups per amino ($-NH_2$) group to provide a polyurethane composition having a sufficient free epoxide groups.

Hydrolysis resistance can be determined by immersion in distilled water at 158° F. (70° C.). A substantial retention of tensile strength and elongation after 12 days immersion can be related to a substantial resistance to hydrolysis. The tensile and elongation are determined at about 25° C. by methods typically used by those having skill in the art.

Typical epoxy resin compounds can be used for this purpose and are well known to those having skill in the epoxy resin art.

Usually epoxy resins are of moderately high molecular weight containing more than 10, and usually more than 20 carbon atoms per molecule. The epoxy group content of such resins is usually expressed as epoxide equivalent or grams of resin containing a gram of epoxide. The equivalent of a commercial resin is generally expressed as a range, such as 125–175, 150–200, etc. Epoxy resins having low epoxide equivalents, in the range of about 125 to about 250, are usually preferred because of their low viscosity.

Particularly useful epoxide resins are those derived from the reaction of epichlorohydrin and a bis-phenol such as 2,2-bis(4-hydroxyphenyl)propane and having an epoxide equivalency of about 150 to about 220, preferably about 175 to about 210.

Further illustrative examples of suitable epoxy resins and methods of preparation may be found in U.S. Pat. No. 3,350,406 and the use of epoxy resins in polyurethanes generally described, for example, in U.S. Pat. No. 3,926,919.

As hereinbefore described, the invention has particular applicability for providing contrasting colored sidewalls for pneumatic rubber tires. In this regard it is desired and usually required that the rubber sidewall base to which the laminate is to be formed and adhered is non-staining in nature. In other words, the rubber base is to be of a blend of rubbers which inhibit the migration of various compounding materials, including rubber processing oils, to the outer surface of the base rubber.

In this regard, then, it is desired that a major portion, at least 50 percent and preferably about 70 percent, by weight of the base sidewall rubber be comprised of a butyl rubber and an ethylene-propylene copolymer. Particularly representative of the butyl rubbers are butyl itself, which is a copolymer of isobutylene and isoprene, as well as chlorobutyl and bromobutyl rubbers. Representative of the ethylene-propylene copolymers are rubbery ethylene-propylene copolymers themselves and ethylene/propylene terpolymers of ethylene/propylene and a minor portion of a conjugated diene.

While certain representative embodiments and details have been shown for the purpose of illustrating the invention, it will be apparent to those skilled in this art that various changes and modifications may be made therein without departing from the spirit or scope of the invention.

What is claimed is:

1. A tire which comprises a composite structure of a cured rubber tire having adhered thereto a laminate of a cured polyurethane prepared by (A) applying to a cured rubber tire a solution of a reaction mixture comprised of (i) an aliphatic primary diamine, (ii) a prepolymer prepared by reacting an organic polyisocyanate having an isocyanate functionality in the range of about 2 to about 2.8, with a polycaprolactone polyol having a number average molecular weight in the range of about 2500 to about 3700, and an average hydroxy functionality of about 2, and (iii) about 7 to about 90 weight percent organic solvent based on the total of (i, ii and iii), where the mole ratio of isocyanate groups to hydroxyl groups of the polyol is in the range of about 1/1 to about 3/1, and where the mole ratio of amine groups of the diamine to excess isocyanate groups over the hydroxyl groups is in the range of about 0.8/1 to about 1.2/1, and (B) drying and curing the applied solution of reaction mixture to form the composite structure.

2. The tire of claim 1 where an outer surface of the cured rubber tire on which the laminate is to be formed is first cleaned with an organic solvent and dried to remove surface oils and mold release agent which may have remained after the tire had been cured.

3. The tire of claim 1 where, in the reaction mixture, about 70 to about 100 weight percent of the solvent is mixed with the diamine curative, the remainder of the solvent mixed with the prepolymer, before mixing the diamine and prepolymer.

4. The tire of claim 1, where the composite is a pneumatic rubber tire having a ground contacting tread portion and spaced beads connected by sidewalls extending radially from said beads to said tread, and having said laminate adhered to and over at least a portion of the outer surface of at least one of said sidewalls.

5. The tire of claim 4 where said outer sidewall surface is first prepared by (i) optionally buffing, (ii) cleaning with an organic solvent and drying, and (iii) optionally followed by treating with chlorine water and drying.

6. The tire of claim 1 where the cured polyurethane laminate contains about 5 to about 100 parts by weight based on 100 parts of polyurethane prepolymer of reinforcing filler.

7. The tire of claim 6 where said cured polyurethane laminate is characterized by having an ultimate tensile strength of from about 300 to about 2000 psi at 25° C. and a corresponding ultimate elongation of from about 700 to about 250 percent at about 25° C.

8. The tire of claim 7 where the 100 percent modulus of the cured polyurethane laminate is from about 60 to about 170 percent of the 100 percent modulus of the rubber of the surface of the tire to which it is adhered.

9. The tire of claim 7 where the reinforcing filler is selected from at least one of carbon black, titanium dioxide, zinc oxide, calcium carbonate, filler clays, silicas and coloring pigments.

10. The tire of claim 7 where, in the polyurethane laminate the polycaprolactone polyol has a number average molecular weight in the range of about 2700 to about 3100 and is prepared by reacting $\epsilon$-caprolactone with an initiator selected from at least one of diethylene glycol, 1,4-butane diol, 1,5-butane diol and 1,6-hexane diol, and, optionally, a small amount of modifier selected from at least one of adipic acid, succinic acid, azelaic acid or the condensation product of low molecular weight saturated hydrocarbon diols containing 2 to 10 carbon atoms with an organic polycarboxylic acid selected from adipic acid, succinic acid and azelaic acid, anhydrides of such acids and polyethylene adipate and poly(ethylene-propylene)adipate.

11. The tire of claim 10 where in the preparation of the polycaprolactone polyol, $\epsilon$-caprolactone is reacted with diethylene glycol and adipic acid.

12. The tire of claim 11 where in the polyurethane laminate the diisocyanates are selected from at least one of 3-isocyanatomethyl-3,5,5-trimethylcyclohexyl isocyanate, 4,4'-methylene bis cyclohexane diisocyanate, 1,4-cyclohexane bis methyl isocyanate, p-xylene diisocyanate and m-xylene diisocyanate; and where the diisocyanates are selected from at least one of p-xylene diamine, m-xylene diamine, 4,4'-diamino-dicyclohexyl methane, 3-aminomethyl-3,5,5-trimethylcyclohexylamine, 1,4-cyclohexane-bis-methylamine, tetrachloro-p-xylene diamine, cyclobutane-1,2-bis-methylamine, menthane diamine, imino bis propylamine, ethylene diamine, propane diamine, trimethylene diamine, tetramethylene diamine, hexamethylene diamine and dimethyl hexamethylene diamine.

13. The tire of claim 1 which comprises a composite structure of a cured pneumatic rubber tire having a ground contacting tread portion and spaced beads connected by sidewalls extending radially from said beads to said tread and having adhered to the outer surface of at least one of said sidewalls a laminate of a cured polyurethane prepared by (A) treating the outer surface of the tire sidewall on which the laminate is to be formed by the steps of (i) optionally buffing, (ii) cleaning with an organic solvent and drying, and (iii) optionally followed by treating with chlorine water and drying, (B) applying to a cured rubber tire a solution of a reaction mixture comprised of (i) an aliphatic primary diamine having its amino groups attached to non-benzenoid carbon atoms, (ii) a prepolymer prepared by reacting an organic polyisocyanate having isocyanate functionality in the range of about 2 to about 2.8 and having its isocyanate groups connected to non-benzenoid carbon atoms, with a polycaprolactone polyol having a number average molecular weight in the range of about 2700 to about 3100 and an average hydroxyl functionality of about 2, (iii) about 7 to about 90 weight percent organic solvent based on the total (i), (ii) and (iii) and (iv) about 5 to about 100 parts by weight based on 100 parts by weight prepolymer of reinforcing filler; where the mole ratio of isocyanate groups to hydroxyl groups of the polyol is in the range of about 1.5/1 to about 2.5/1 and where the mole ratio of amine groups of the diamine to excess isocyanate groups over the hydroxyl groups is in the range of about 0.9/1 to about 1.1/1 and (C) drying and curing the applied solution of reaction mixture to form the adherent composite structure where said cured polyurethane laminate is characterized by having an ultimate tensile strength of about 300 to about 2000 psi and a corresponding ultimate elongation of about 700 to about 250 percent at about 25° C.

14. The tire of claim 1 in which said adherent cured polyurethane laminate contains an epoxy resin added by mixing from 1 to about 15 and at least a sufficient amount to give an excess of epoxide groups relative to total excess of amino groups of the diamine curative over excess isocyanate groups of the prepolymer by mixing said epoxy resin with at least one of the diamine component prepolymer, optionally containing the filler component, where said epoxide resin has an epoxide equivalent in the range of about 125 to about 250.

15. The tire of claim 14 in which said epoxy resin has an epoxide equivalency of about 150 to about 220 and is derived from the reaction of epichlorohydrin and 2,2-bis(4-hydroxyphenyl)propane.

16. The tire of claim 1 wherein the rubber substrate of the surface of the pneumatic rubber tire to which the laminate is to be formed and adhered is comprised of at least one of rubbery butadiene/styrene copolymers, butadiene acrylonitrile copolymers, polyisoprene, polybutadiene, isoprene-butadiene copolymers, a butyl rubber, ethylene-propylene copolymers and ethylene-propylene terpolymers containing a minor amount of a conjugated diene.

17. The tire of claim 16 where said butyl rubber is selected from at least one of butyl rubber, chlorobutyl rubber and bromobutyl rubber.

* * * * *